United States Patent Office 2,891,057
Patented June 16, 1959

2,891,057
METHODS OF MAKING CELLULOSE ETHERS

Jerker Olof Porath, Uppsala, Sweden, assignor to Mo Och Domsjo Aktiebolag, Ornskoldsvik, Sweden, a corporation of Sweden No Drawing. Application October 16, 1957
Serial No. 690,446

Claims priority, application Sweden November 9, 1956

1 Claim. (Cl. 260—231)

The present invention relates to cellulose ethers. The main object of the present invention is to provide new cellulose ethers which may find practical utility for various purposes. Other objects will appear as the description proceeds.

The objects of this invention are achieved by reacting an alkali cellulose with a halomethanesulfonic acid or a water-soluble salt thereof to form novel cellulose ethers which hereinafter will be designated with the generic term sulfomethylcellulose. The term sulfomethylcellulose as used herein includes the free acid form as well as its salts with various bases, in particular the alkali metal salts, such as sodium sulfomethylcellulose.

Depending on the degree of substitution (average number of sulfomethyl groups per anhydroglucose unit of the cellulose) which may vary within wide limits, sulfomethylcellulose is insoluble or more or less soluble in water. Below a degree of substitution of about 0.1, the sulfomethylcellulose is insoluble in water, while an increased solubility in water is obtained when the degree of substitution exceeds 0.1. It has been found that the water-insoluble type of sulfomethylcellulose has good cat-ion-exchange characteristics and may be used with advantage for fractionating high-molecular weight substances such as proteins, nucleic acids and the like. For this purpose it is superior to prior art cat-ion exchangers based on synthetic resins which have the disadvantage that they have a more or less marked denaturing action on such substances as proteins and the like.

The water-soluble types of sulfomethylcellulose may with advantage be used as thickening agents, binding agents, dispergators, emulsifiers and the like for various industrial purposes. Thus, they may be used in the pharmaceutical and cosmetic industries as an ointment and cream base, as a binding agent in tableting, as emulsifier and thickener in various preparations, such as shampoos and tooth pastes; in the food industry as thickener and stabilizer in the manufacture of various foods; as a wallpaper paste; in pencil manufacture as a binding agent in graphite and colored pencils; in the building industry as an ingredient in mortar and concrete and as a plasticizer to improve tile and mosaic compounds; in the tobacco industry as a binding agent for wrapper leaves in cigar manufacture; in the leather industry as a finishing agent and as an adhesive in the pasting method; in the rubber industry as a binding agent for talc in the milling of raw rubber and as a thickener in rubber latex; in the bookbinding industry as an adhesive; in the paper industry as an aid in surface treatment, impregnation and sizing of paper, as a thickener in the manufacture of lacquered and enamelled paper, as an adhesive in the manufacture of cardboard, as a binding agent in pastes, as an additive in the manufacture of greaseproof, as a component in pigment pastes; in the paint industry as a component in emulsion paints and distempers; as a stabilizer in dispersions of insecticides and fungicides; in the linoleum industry as a protective agent for surfacing linoleum floor covering in transport and storage; as a component in oilwell drilling muds; in the ceramics industries as a component in filling pastes etc.; as a binding or plasticizing agent in the manufacture of china goods etc., as a thickener and binder in glazing baths; in the metal industry as a protective agent for metal sheets in transport and storage and as a lubricant in pipe and wire drawing; in the foundry art as a core binder and core adhesive; in the lagging art as a binding agent in the manufacture of lagging, as a binding agent for cloth used in the insulation of chemical apparatus, heaters, refrigerating plants etc.; in the electrical industry as a sizing agent for asbestos; in the rope-making industry as a finishing agent in the manufacture of cord and twine; and in other industries, e.g. as a thickener in shoe and furniture polishes.

As a starting material for preparing the sulfomethylcellulose it is possible to use cellulose of various types. Preferably, cotton, cotton linters or chemical pulp will be used. The last mentioned material may be manufactured by the sulfite, sulfate or soda method from wood, straw, bagasse, esparto or other vegetable material. Preferably, bleached refined grades of pulps, so-called dissolving pulps, will be used. However, screenings from sulfite or sulfate cellulose production, e.g. incompletely disintegrated parts of the chips, having a high content of resin and lignin may also be used.

In order to prepare the sulfomethylcellulose, the cellulose is first mercerized, i.e. treated with alkali in the presence of water to produce alkali cellulose in the well-known manner. The methods used in practice for this purpose may vary considerably. Sheets of cellulose pulp may be immersed in aqueous alkali, whereupon excess alkali is squeezed out and the resulting alkali cellulose is shredded. Cellulose pulp in the form of rolls may be passed continuously through a bath of aqueous alkali and be squeezed between rollers. Cellulose pulp in sheet or roll form may be shredded with the aid of a mechanical stirring device to form a fibrous mass in aqueous alkali, so-called slurry mercerization, whereupon excess alkali will be squeezed out continuously between rollers or batchwise in a plunger press. Sheets of cellulose pulp may be shredded in a Werner-Pfleiderer type mixer equipped with rotating arms, whereupon aqueous alkali will be added. Similar equipment may be used if the starting material is in powdered or particulate form. Such material may also be sprayed with aqueous alkali in a rotating drum or cylinder. Other technical methods of contacting the cellulose with the aqueous alkali may be employed. Such methods are well-known to those skilled in the art and need not be described in detail here, since it is immaterial as far as this invention is concerned in which manner the alkali cellulose is obtained.

To prepare sulfomethylcellulose in accordance with this invention, the mercerizing step will be carried out with an amount of alkali hydroxide of 20% to 250%, preferably 50% to 150%, based on the weight of cellulose and so that the resulting alkali cellulose will contain about 80% to 350% water based on the weight of cellulose. The alkali used will for economical reasons preferably be sodium hydroxide, although also potassium hydroxide or other hydroxides of the alkali group may be used.

The resulting alkali cellulose will then in accordance with the present invention be reacted with a halomethanesulfonic acid or a water-soluble salt thereof. Preferably, chloromethanesulfonic acid or its sodium salt is used. The latter may be obtained by reacting dichloromethane with sodium sulfite, e.g. by reacting an ethanolic solution of dichloromethane with an aqueous solution of sodium sulfite in an autoclave at 100 to 150° C. In addition to the sodium chloromethanesulfonate, sodium chloride is formed by this reaction. The sodium chloromethanesulfonate may be purified to a higher or lower degree, e.g. by extraction with methanol, or the crude product may be used as such for the reaction according to this invention. If desired, the free acid may be obtained by acidifying a solution of the sodium salt, but since the reaction of this invention is carried out in an alkali medium, it s generally unnecessary to prepare the free acid. Instead of the sodium salt of the chloromethanesulfonic acid, it is of course also possible to use other water-soluble salts, such as the potassium or ammonium salt. The cation of the salt is of no importance as long as it does not render the salt insoluble in the reaction mixture. Instead of the chloromethanesulfonic acid or a salt thereof, it is also possible to use bromomethanesulfonic acid or iodomethanesulfonic acid or the sodium, potassium, ammonium or other water-soluble salts of these acids.

The alkali cellulose is contacted with a suitable amount, depending on the desirable degree of substitution of the final sulfomethylcellulose, e.g. 5% to 75% based on the weight of the initial cellulose, of chloromethanesulfonic acid or salt thereof. In the case of bromo- or iodomethanesulfonic acid or salts thereof, equivalent amounts of these acids will be used.

The reaction is then allowed to proceed at a temperature of about 60 to 130° C., preferably 80 to 100° C. until the desired degree of substitution is achieved, which as a rule will require a period of from 1 to 40 hours. The reaction mixture will be kept under such conditions that water will evaporate from the mixture. In general, it has been found that the reaction does not appear to commence until the moisture content of the reaction mixture has decreased to below about 25% by weight (based on the reaction mixture). It will therefore be most preferable to start with as low a concentration of water as possible in the reaction mixture. However, to produce a satisfactory penetration of the alkali into the cellulose, it is in practice not possible to lower the amount of water in the mercerization step below a certain limit. Best results are obtained with an amount of water of 150 to 300% based on the weight of cellulose.

To obtain a water-insoluble sulfomethylcellulose suitable for use as an ion exchanger the reaction will be carried out so as to provide a degree of substitution not above 0.1. The degree of substitution, however, should preferably not be below 0.03 and most preferably it should be at least 0.05. To obtain a sulfomethylcellulose which is soluble in water and/or in aqueous alkali the degree of substitution should be above about 0.1, preferably above 0.15. The theoretical upper limit is 3.0, but in practice the degree of substituion will generally be below about 1.0. The degree of substitution depends mainly on the amount of halomethanesulfonic acid charged and on the time of reaction. The conditions suitable for a given degree of substitution may readily be determined by simple preliminary experiments. To produce a sulfomethylcellulose suitable for use as an ion exchanger, an amount of chloromethanesulfonic acid or salt thereof of 5% to 15% based on the weight of the cellulose (or equivalent amounts of bromo-iodomethanesulfonic acid or salt thereof) and reaction time of from 1 to 15 hours are preferably used, while amounts above 15% and/or longer reaction times will generally result in a water-soluble sulfomethylcellulose.

It is possible to carry out the etherification in the presence of inert diluents, which may be miscible with water, e.g. isopropanol, butanol, ethanol, acetone or dioxane. The equipment used for the reaction may be any conventional type of reaction vessel suitable for a reaction of this type. It is preferable to provide efficient agitation of the reaction mixture, for which purpose the reaction vessel should be provided with stirrers or other agitating means. It is also found that the reaction should preferably be carried out in the absence of air, for which purpose the reaction may be carried out in a closed vessel connected to evacuating means.

When the desired degree of substitution is obtained, the reaction is discontinued. The crude product may be used as such, although preferably after neutralization e.g. by carbon dioxide. Often, it is preferable to purify the crude product. A method comprises adding an organic liquid, such as methanol, ethanol or the like, to the reaction mixture and neutralizing it with an acid, such as hydrochloric acid, acetic acid, carbonic acid or the like. The sulfomethylcellulose is then separated from the liquid by filtration, centrifuging or the like and is washed with water, if a water-insoluble product is prepared, or with an organic liquid if a water-soluble product is prepared, whereupon the product is dried.

The invention is further illustrated by the following examples.

*Example 1*

100 g. of shredded cotton linters are mixed with a solution of 200 g. of sodium hydroxide in 300 ml. of water. The mixture is stirred well and the cotton linters allowed to swell for 4 hours. 10 g. of sodium chloromethanesulfonate dissolved in 60 ml. of water are added in portions with efficient agitation. The mixture is placed in an oven at 90 to 95° C. and is stirred now and then and weighed at regular intervals. When the water content has fallen to about 20%, which requires about 15 hours, the reaction is interrupted. A sample is taken, cooled, suspended in water, decanted, neutralized and sucked dry on a Büchner funnel. It is then washed with 5% hydrochloric acid and with water to neutral reaction, and further washed with ethanol and with ether. After evaporation of the ether, the sample is weighed, dissolved in 0.5 M NaCl and titrated with 0.1 M NaOH. If the degree of substitution is below 0.03, heating of the main portion of the product is continued until the water content is below 15%. Thereupon, the reaction mixture is cooled and poured into 1 liter of 95% ethanol. 1 liter of 10% hydrochloric acid is added slowly with stirring and cooling. When the development of heat has stopped, stirring is discontinued and the product is allowed to settle. 1 liter of 10% ethanolic hydrochloric acid is added and the procedure repeated. After settling, the liquid is drawn off on a Büchner funnel. The product is washed with 1 liter of 5% hydrochloric acid and with water to neutral reaction, whereupon the white product is sucked dry. The resulting product is water-insoluble and may be used as an ion exchanger.

*Example 2*

Following the procedure of Example 1, but using instead of the sodium chloromethanesulfonate an equivalent amount of sodium bromomethanesulfonate, a product having properties similar to that of Example 1 is obtained.

*Example 3*

60 g. of shredded cotton linters are mixed with a solution of 120 g. of sodium hydroxide in 240 ml. of water. The mixture is stirred and the cotton linters are allowed to swell for 12 hours. 40 g. of sodium chloromethanesulfonate dissolved in 50 ml. of water are added in portions with efficient stirring. The mixture is placed in an oven at 90° C. and allowed to stand until the water content has decreased to 20%. Thereupon, the mixture is treated in the same way as in Example 1 except that the final washing is carried out with methanol instead of with hydrochloric acid and water. Analysis of the product shows a sulfur content of 4%, corresponding to a degree of substitution of 0.3. The product is soluble in water.

*Example 4*

100 g. of shredded cotton linters are mixed with 200 g. of sodium hydroxide and 300 ml. of water. The cotton linters are allowed to swell for 4 hours, whereupon 40 g. of sodium chloromethanesulfonate dissolved in 60 ml. of water are added with efficient agitation. The mixture is allowed to stand in an oven at 90° C. for 20 hours, whereupon it is treated as in Example 3. A water-soluble product having a degree of substitution of 0.2 is obtained.

*Example 5*

Sulfite cellulose in sheet form is mercerized with a 40% aqueous solution of sodium hydroxide for 45 minutes. Excess alkali is squeezed out and the resulting alkali cellulose is shredded. 92 g. of this alkali cellulose (40 g. of the initial cellulose) are admixed with an additional amount of 40% sodium hydroxide so that the ratio of cellulose to sodium hydroxide solution is 1:3. Thereupon, 18.3 g. of sodium chloromethanesulfonate dissolved in 17 ml. water are added dropwise with efficient stirring. The mixture is transferred to a low open vessel and is placed in a vacuum oven at 95° C. After 40 hours of reaction, when the reaction product contains 13% of moisture, it is cooled and slurried in 75% methanol. The excess of sodium hydroxide is neutralized with concentrated acetic acid. The product is separated from the liquid on a suction filter and is washed with 75% methanol, whereupon it is dried at 70° C. The resulting product is water-soluble. It has a sulfur content of 4.0% corresponding to a degree of substitution of 0.24. The viscosity of a 3% aqueous solution is about 410 centipoise at 20° C. measured with a Brookfield viscometer.

*Example 6*

By proceeding as in Example 5 except that the cellulose is mercerized with a 30% aqueous sodium hydroxide and the ratio of cellulose to aqueous sodium hydroxide is 1:5, there is obtained a water-soluble product having the viscosity of 1020 centipoise in 3% aqueous solution.

*Example 7*

Sulfite cellulose is mercerized with a 19% aqueous sodium hydroxide in the same manner as in Example 5. To 240 g. of the resulting alkali cellulose having a ratio of cellulose to aqueous sodium hydroxide of 1:3, 13.7 g. of sodium chloromethanesulfonate dissolved in 24 ml. of water are added. After 40 hours of reaction in a vacuum oven at 95° C., when the product contains 10% of moisture, it is treated in the manner described in Example 5. A water-soluble product having a viscosity of 510 centipoise in 3% aqueous solution at 20° C. in a Brookfield viscometer is obtained.

*Example 8*

2500 g. of high-viscosity cellulose powder from sulfite cellulose are mixed with 7500 g. of 40% aqueous sodium hydroxide in an autoclave equipped with stirrer. After 1 hour of stirring, 250 g. of sodium chloromethanesulfonate dissolved in 1250 ml. of water are added. The reaction is carried out in vacuum at 100° C. with continuous agitation. After 10 hours of reaction, when the product contains 6% of moisture, it is cooled and slurried in 50% ethanol. Excess of sodium hydroxide is neutralized with concentrated hydrochloric acid while cooling. The solid product is allowed to settle and the liquid is decanted. The product is slurried in 10% hydrochloric acid and—after filtration on a suction filter— in water to neutral reaction. The greyish white product is separated by centrifugation and is dried cautiously at 70° C. The resulting product is suitable for use as an ion exchanger.

*Example 9*

Sulfite cellulose in sheet form is mercerized with a 19% aqueous sodium hydroxide in the manner described in Example 5. 320 g. of alkali cellulose having a ratio of cellulose to aqueous sodium hydroxide of 1:3 is mixed in a household mixer with 52 g. of technical grade sodium chloromethanesulfonate (35.7 g. of pure salt) dissolved in 75 ml. of water. The reaction mixture is transferred to a 2 liter autoclave equipped with stirrer, in which the reaction is carried out in vacuum with continuous stirring. The mixture is heated in the autoclave to 100° C. during two hours and is then kept at 100° C. during one hour. After that time the reaction product contains 4% of moisture. The product is slurried in 1 liter of 95% ethanol, and carbon dioxide is bubbled through the mixture to neutralize excess of sodium hydroxide. After filtration on a suction filter and drying, the resulting product contains 54% of sulfomethylcellulose, the remainder mainly being inorganic salts. The product is soluble in water. The viscosity according to Brookfield of a 2% aqueous solution at 20° C. is 6 centipoises.

I claim:

A method of making a cellulose ether, which comprises reacting cellulose with aqueous alkali to form an alkali cellulose comprising 20% to 250% of alkali hydroxide and 80% to 350% of water, based on the weight of the cellulose, and reacting said alkali cellulose with a substance selected from the class consisting of halomethanesulfonic acids and water-soluble salts thereof in an amount equivalent to 5% to 75% of chloromethanesulfonic acid, based on the weight of said cellulose, at a temperature of about 60° C. to 130° C. under such conditions that water is removed from the reaction mixture for a period of time of from 1 to 40 hours until the water content of the reaction mixture has decreased to below 25% by weight, based on the reaction mixture.

References Cited in the file of this patent

UNITED STATES PATENTS

| | | |
|---|---|---|
| 2,591,748 | Vaughan | Apr. 8, 1952 |
| 2,681,846 | Guthrie et al. | June 22, 1954 |
| 2,811,519 | Touey | Oct. 29, 1957 |
| 2,820,788 | Filbert et al. | Jan. 21, 1958 |